United States Patent
Halpern

(10) Patent No.: US 6,810,247 B1
(45) Date of Patent: Oct. 26, 2004

(54) RECOVERY IN A WIRELESS ENVIRONMENT

(75) Inventor: Mordechai Halpern, Cambridge, MA (US)

(73) Assignee: Wysdom Wirless, Inc., Cambridge, MA (US)

( * ) Notice: Subject to any disclaimer, the term of this patent is extended or adjusted under 35 U.S.C. 154(b) by 479 days.

(21) Appl. No.: 09/788,078

(22) Filed: Feb. 16, 2001

Related U.S. Application Data

(60) Provisional application No. 60/183,297, filed on Feb. 17, 2000.

(51) Int. Cl.[7] .................................................. H04Q 7/20
(52) U.S. Cl. ........................ 455/423; 717/124; 717/127; 717/131; 365/201
(58) Field of Search ................................ 717/131, 124, 717/127; 725/133; 711/207; 709/213; 710/260; 455/414.1, 415, 422.1, 423; 365/201

(56) References Cited

U.S. PATENT DOCUMENTS

| 5,301,198 A | * | 4/1994 | Kawasaki ................... 717/131 |
| 5,461,588 A | * | 10/1995 | Sardeson et al. ........... 365/201 |
| 6,003,123 A | * | 12/1999 | Carter et al. ................ 711/207 |
| 2002/0019985 A1 | * | 2/2002 | Fuccello et al. ............ 725/133 |

* cited by examiner

*Primary Examiner*—Fan Tsang
*Assistant Examiner*—Md. Shafiul Alam Elahee
(74) *Attorney, Agent, or Firm*—Bromberg & Sunstein LLP

(57) ABSTRACT

A method of providing recovery of user interaction associated with a two-way wireless communication session. The method includes associating a series of virtual pages with program blocks, storing program block state information in the virtual pages, and using stored virtual pages to recover from an interrupted communication session.

4 Claims, 2 Drawing Sheets

A Program Segment, Blocking and Virtual Pages

RECOVERY IN A WIRELESS ENVIRONMENT

This application claims priority from U.S. Provisional Application Ser. No. 60/183,297, filed Feb. 17, 2000, which is incorporated herein by reference in its entirety.

TECHNICAL FIELD

This invention generally relates to wireless communications, and more particularly to systematic recovery of a session.

BACKGROUND ART

In the prior art, in a two-way wireless communication session in which a user is engaged in a transaction interacting with a remote process and contact is lost with the remote process, the user must re-establish a connection with the remote process and begin the session over in order to complete the transaction. For example, if a user is attempting to purchase stock through a wireless transmission using a WAP (wireless application protocol) enabled device, the user will enter user information through a selection interface. The entered information may include a user id and responses to a variety of prompted questions such as whether the user is buying or selling, whether the user wants stocks or mutual funds, the name of the stock which is being purchased etc. At any time during the session with the remote process, the transmission may be broken due to signal fading, diffraction, signal scattering or any of a variety of problems which occur in a wireless environment. This interruption in the session causes the session at the remote process to be terminated. The data which was entered during the session may be lost. Upon reestablishing communication with the server, the user is unable to continue the transaction at the point where the transmission was broken.

SUMMARY OF THE INVENTION

A system and method of providing recovery of user interaction associated with a session is disclosed. In a wireless environment where a user employs a wireless device to communicate with a server, communication between the wireless device and the server may experience an interruption. During such an interruption the session may be recovered, permitting the user to continue to interact in a manner providing continuity notwithstanding the interruption. In such an embodiment, an identifier is associated with the user to aid in the recovery. The identifier could be a log-in name or a device id or a biometric etc.

Recovery is achieved by structuring a process flow associated with the session into a series of transaction blocks. With respect to each block, a non-null set of virtual pages is defined and associated. The virtual pages provide a structure for data permitting the associated block to execute and a structure for any data generated by the associated block that are necessary for use by a downstream block. In the course of executing the session, the set of virtual pages associated with each block is stored in a storage medium as the block is executed along with a reference to the identifier. The set of virtual pages includes an entry and an exit page. An entry virtual page contains formulae that allow the computation of all data required for the activation of the next block. At each stage the computation is based on data available in prior executed virtual pages. An Exit page for a block collects all the new data created by the execution of the block, and is available for all downstream entry pages. When an interruption occurs, the storage medium is searched for virtual pages having a reference to the identifier and the execution of the session is continued based on data in the stored virtual pages. Prior to continuing execution, a last stored set of virtual pages associated with the session is identified and processing is resumed at a block immediately subsequent to the block associated with the last stored set of virtual pages. In a preferred embodiment, the transmission protocol is WAP and the information that is displayed on the wireless device is graphical information in the form of WEB-based pages.

In a further embodiment of the invention, when an interruption is experienced between the wireless device and the server, the user is first asked whether the user wants to continue with the interrupted session or to start a new session. If the user requests continuation of the interrupted session, recovery proceeds as described above. If the user requests the start of a new session, a new session is initiated.

BRIEF DESCRIPTION OF THE DRAWING

The foregoing features of the invention will be more readily understood by reference to the following detailed description, taken with reference to the accompanying drawing, in which.

DETAILED DESCRIPTION OF SPECIFIC EMBODIMENTS

For the purposes of the description herein and the claims that follow it, unless the context otherwise requires, the term "block" refers to any functional piece of code and may include functions, object-methods, forms, hyper text markup language (HTML), World Wide Web pages, or computer language code. A "data element" within the description and the claims may be, but is not limited by the terms variable, object, class, table, list, formula and figure. As used in this description and the accompanying claims, a "virtual entry page" or "virtual exit page" is defined as an aggregate of data elements but it may also be empty of data elements.

As explained in further detail below, embodiments of the present invention utilize virtual pages, the contents of which are saved to permit state recovery in the event that program flow experiences an interruption. In this connection, it has been found useful to employ techniques described in U.S. Pat. No. 6,106,572, entitled a "Forward and Reverse Hierarchical Page Level Debugger" (by the same inventor as herein), although the technology described in this patent is used for a non-analogous purpose; this patent document is incorporated herein by reference in its entirety.

Figure 1:
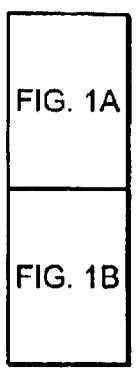
FIG. 1 is a representation of a process which executes on a server during a wireless communication session with a wireless device.
Figure 1A:
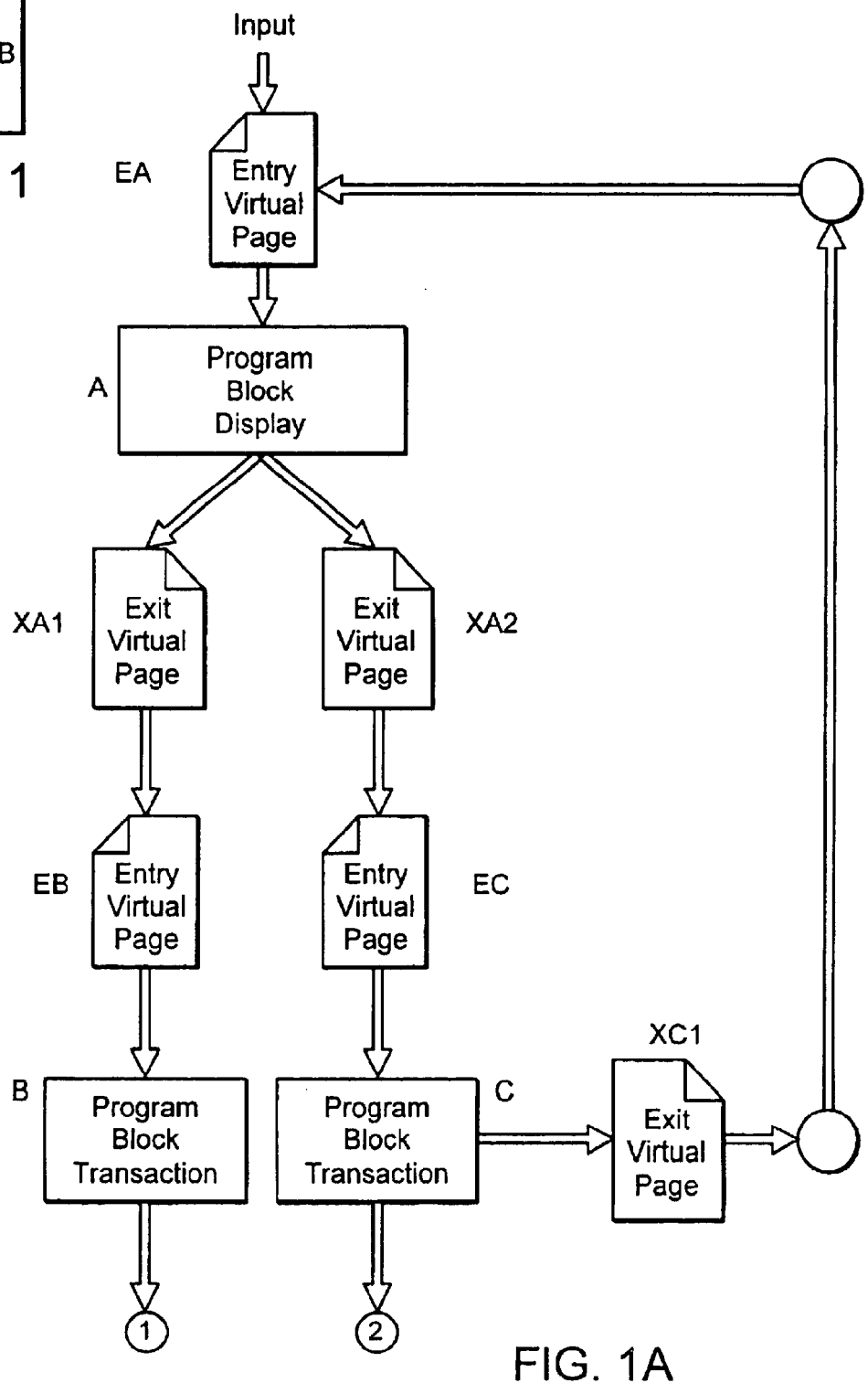
Figure 1B:
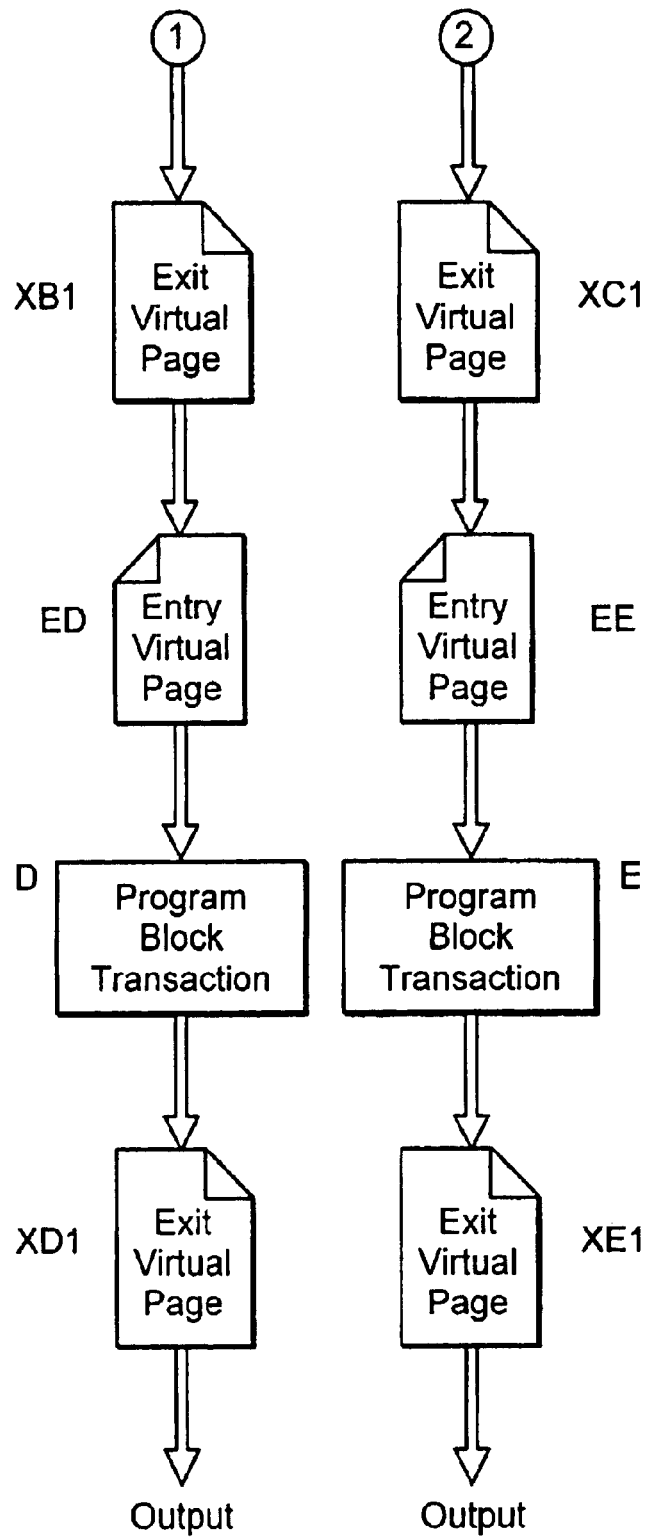

FIG. 1 is a representation of a process which executes on a server during a wireless communication session with a wireless device (such as a cellular phone, a PCS phone, a personal digital assistant, etc.) and is coded in such a way as to make recovery of a lost session possible. To accommodate recovery, prior to execution of the process which is to be run on the server, the program code is broken into blocks. The program code for wireless communications can be characterized by two types of program segments which can be designated as blocks. The first type of block is a Display Block which represents program code which generates and sends the web pages or graphical displays for the wireless device and receives data from the user interaction with the graphical display. (The execution of the display-type block typically involves the user entering information and pushing a button on the wireless device.) The second type of block is a Transaction Block which is representative of a program segment that is executed in the server and typically involves the data source (a data base or XML page for example). Once the program is broken up into blocks, the blocks are associated with a set of virtual pages. The set of virtual pages includes a virtual entry page and a virtual exit page. The virtual entry page contains all of the data elements which are required for a block of the program segment to be executed. For example, a virtual entry page may include a data element which is defined as a formula. The formula has references to data elements from other entry and exit pages (these data elements within the formula may also be composed of formulas and relate still further to data elements from different virtual pages) which when executed will determine the data element to be used by the block which is associated with the virtual entry page. A virtual exit page contains all of the data elements which result from the execution of the block. The server is also provided with a mapping of possible process flows that may occur during execution of the program. Such a mapping includes the entire structure of the program including the associated virtual pages and all of the possible loops and paths. Additionally, the program is designed so that all of the output pages are saved and associated with an identification tag which is indicative of the user and also of the session.

After the program is configured with the virtual pages and defined in terms of blocks, the program may be compiled and executed. During a wireless session, the server keeps track of all the virtual pages in a stack in memory or in another memory location in which the virtual pages have been saved. The virtual pages are associated with an identification tag such as a user id, session id or the calling device id. When communication breaks down between the server and a wireless device of the user, the server accesses the stored virtual pages and correlates the output pages with the mapping of the process flow. In another embodiment the entire process flow is known solely by the saved virtual pages, since the virtual pages define the path of execution through the blocks of program code. The virtual pages also contain all the requisite data needed to continue the program from point of interruption. No additional information is needed. The server determines the last virtual page and the last executed block of the program code. By knowing the process flow and thus all of the virtual pages that were used during the execution prior to the signal loss between the server and the wireless device, the data which is necessary for execution of the next program block can be recreated. This is possible because all of the necessary data elements from upstream virtual pages are available for calculating the data elements which are necessary for continued execution. The session can be reestablished and continue from the point where the transmission was lost.

For example, with reference to FIG. 1, the process begins at the virtual entry page EA and continues through program block A which results in data being entered into virtual exit page XA1. The data which is in virtual exit page XA1 is used by virtual entry page EB to calculate variables, arrays, tables, or any data elements that are necessary to have program block B execute. A signal interruption occurs after B executes properly (i.e. the sale went through), thus that the last page IN THE STACK of the server or saved in associated memory is XB1. When the user logs back in within a preset time period prior to the stack or memory location being erased and provides his identifier, the server can then engage in recovery. Recovery begins by determining the process flow by accessing the saved virtual pages which are associated with the identifier. Knowing that the last virtual page is XB1, the server determines that the next virtual page is virtual entry page ED. The server can then access all of the virtual pages which have been used in the session including virtual entry pages EA and EB and virtual exit pages XA1 and XB1 to calculate the necessary data elements that are required for execution of program block D as defined by virtual entry page ED. Once the data elements are calculated for virtual entry page ED, execution continues to proceed and the display page D is displayed on the device. The key point is that all of the information is available from upstream virtual pages to calculate the data elements which are necessary to continue the process as if it was not interrupted. From the user's perspective it appears as if the transaction is being continued at the point of interruption.

In a related embodiment of the invention, when an interruption is experienced between the wireless device and the server, before the server is caused to begin recovery, the user of the wireless device can be provided a choice between resuming the interrupted session and starting a new session. If the user requests resumption of the interrupted session, recovery proceeds as above. If the user requests the start of a new session, a new session is initiated.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method of providing recovery of user interaction associated with a session, wherein a user employs a wireless device in communication with a server, and wherein communication of the wireless device with the server has experienced an interruption, the recovery permitting the user to continue to interact in a manner providing continuity notwithstanding the interruption, the user having an identifier, the method comprising:

structuring process flow associated with the session into a series of transaction blocks;

with respect to each block, defining and associating a non-null set of virtual pages, wherein the virtual pages provide a structure for data permitting the associated block to execute and for any data generated by the associated block that are necessary for use by a downstream block;

in the course of executing the session, storing in a storage medium the set of virtual pages associated with each block as block is executed along with a reference to the identifier; and to provide recovery after the interruption, searching the storage medium for virtual pages having a reference to the identifier and continuing execution based on data in the stored virtual pages.

2. A method according to claim 1, wherein the set of virtual pages includes an entry page and an exit page.

3. A method according to claim 1, wherein continuing execution based on data in the stored virtual pages includes identifying a last stored set of virtual pages associated with the session and resuming processing at a block immediately subsequent to the block associated with the last stored set of virtual pages.

4. A method acccording to claim 1 further comprising:

after the interruption, as a condition to providing recovery after the interruption, providing the user with a choice between resuming the interrupted session and starting a new session, and providing recovery after the interruption only if the user chooses to resume the interrupted session.

* * * * *